United States Patent Office 2,939,132
Patented May 31, 1960

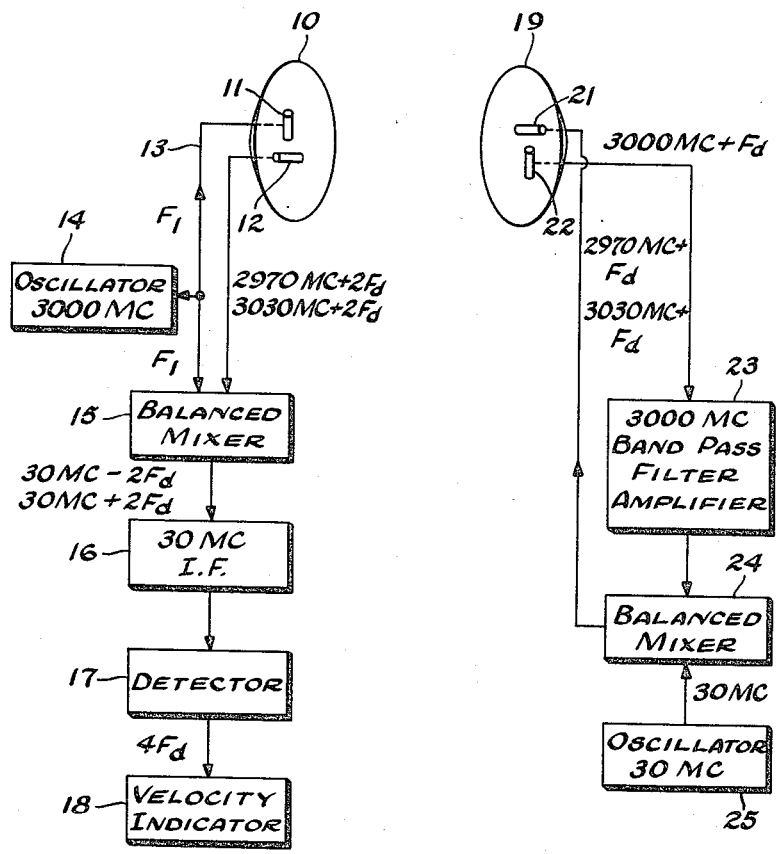

2,939,132

COOPERATIVE DOPPLER FREQUENCY MEASURING SYSTEM

Robert D. Tollefson, Cedar Rapids, Iowa, assignor to Collins Radio Company, Cedar Rapids, Iowa, a corporation of Iowa Filed Jan. 24, 1958, Ser. No. 711,010

5 Claims. (Cl. 343—8)

This invention relates in general to velocity measuring means, and in particular to a Doppler system.

It is oftentimes desirable to determine the relative velocity between two bodies. For example, at the present time many high velocity aircraft are in the skies, and it is important to assure that no collisions occur. The present invention relates to a Doppler velocity indicating system wherein the Doppler frequency between two moving bodies is magnified by a factor of four so as to give increased accuracy and ease of detection.

An object of this invention is to provide a frequency measuring means which has a high degree of accuracy.

Yet another object is to provide a relatively simple frequency measuring system that uses a minimum number of components.

A feature of this invention is found in the provision for a frequency measuring system wherein cross-polarized antennas are used on two bodies and with transmitting and receiving apparatus on both bodies connected to the cross-polarized antennas.

Further features, objects and advantages will become apparent from the following description and claims when read in conjunction with the accompanying drawings, in which:

Figure 1 illustrates a portion of the apparatus of this invention, and

Figure 2 illustrates the compatible apparatus mounted on the other body.

Figure 1 illustrates an antenna 10 which might be, for example, of the parabolic type, which has a first antenna feed 11 mounted therein. A second antenna feed 12 is mounted at right angles to the feed 11 so as to obtain cross-polarization isolation between the two feeds. A radio frequency oscillator 14 supplies energy to the antenna feed 11 through the lead 13.

An antenna 19 is mounted on a body remote from the first antenna 10 and has a first feed 22 oriented in the same plane as the feed 11. A second feed 21 is mounted in the reflector 19 and is oriented at right angles to the first. The feed 22 will pick up energy radiated from the feed 11 which will be at the frequency of the oscillator 14 modified by the Doppler frequency between the two bodies upon which the apparatus is mounted. The Doppler frequency, as is well known, varies with the relative velocity of the two bodies.

A bandpass filter amplifier 23 receives the output of the antenna feed 22 and amplifies and passes signals at the frequency of the oscillator 14 modified by the Doppler frequency shift. The output of the filter amplifier 23 is supplied to a balanced mixer 24, which also receives an input from an oscillator 25. The output of the mixer 24 will be the sum and difference of the frequencies applied to its input. By way of example, if the oscillator 14 has an output frequency of 3000 megacycles, antenna 22 will receive energy at 3000 megacycles plus the Doppler frequency shift. This signal will be amplified and passed to the balanced mixer 24. If the oscillator 23 produces a signal at 30 megacycles, the outputs of balanced mixer 24 will be 2970 megacycles plus the Doppler frequency shift, and 3030 megacycles plus the Doppler frequency shift. These components are supplied to the antenna feed 21 and radiated.

The antenna feed 12 is oriented in the same plane as the antenna feed 21 and detects these components, which are modified by the return Doppler frequency.

Thus, with the example selected, the signal received at antenna feed 12 will be 2970 megacycles plus two times the Doppler frequency shift and 3030 megacycles plus two times the Doppler frequency shift. A balanced mixer 15 receives these components along with an input from oscillator 14. The balanced mixer produces an output of 30 megacycles minus two times the Doppler frequency shift and 30 megacycles plus two times the Doppler frequency shift. These components pass through a 30 megacycle intermediate frequency stage 16 and to a detector 17. The detector 17 detects and produces an output of four times the Doppler frequency shift. This signal is applied to a velocity indicator 18 which may be calibrated to indicate directly the relative velocity between the two bodies in which the apparatus is mounted.

The advantages of this system are that the transmitting and receiving antennas on both bodies are isolated from each other due to cross-polarization of the antennas, and this makes it unnecessary to multiply transmitted and received energy so as to separate them. Target information can be distinguished from random noise because of the modulation of the frequency of the oscillator 25 by the Doppler frequency. It is also to be noted that four times the Doppler frequency shift is detected in the detector 17 rather than two times the Doppler frequency shift obtained in standard Doppler systems. This results in a two-to-one improvement in frequency versus velocity characteristic and allows much lower relative speeds to be detected. Therefore, the accuracy of the system is enhanced.

It is seen that this invention provides a simple but highly accurate velocity measuring means and may, for example, be used in a compatible anti-collision system wherein the apparatus of Figure 1 may be mounted in one aircraft and the apparatus of Figure 2 in a second aircraft to indicate to the pilot of the first aircraft the relative velocity between his plane and the second craft. A second similar system could be mounted in the second craft with the apparatus of Figure 1 in the second craft and a unit such as shown in Figure 2 mounted in the first craft. Thus both pilots would know the relative velocity between the two craft.

Although the invention has been described with respect to a particular embodiment thereof, it is not to be so limited as changes and modifications may be made therein which are within the full intended scope of the invention as defined by the appended claims.

What is claimed is:

1. Apparatus for measuring the relative velocity between two bodies comprising a polarized radiating means mounted on the first body, a radio frequency oscillator supplying an input to said first radiating means, a radiant energy receiving means on the first body polarized to prevent energy transfer between the radiating and receiving means, a first balanced mixer receiving inputs from the radio frequency oscillator and the receiving means, and a detector receiving the output of the balanced mixer.

2. Apparatus for measuring the relative velocity between a pair of bodies comprising a first polarized radiating means mounted on the first body, a radio frequency oscillator supplying an input to said first radiating means, a first radiant energy receiving means on the first body polarized to prevent interference between the first radiating and receiving means, a first balanced mixer receiving inputs from said radio frequency oscillator and the first receiving means, a detector receiving the output of the balanced mixer, a second receiving means mounted on the second body and polarized so as to receive energy from the first radiating means, a second balanced mixer receiving an input from the second receiving means, a second oscillator supplying an input to the second balanced mixer, and a second radiating means receiving the output from the second balanced mixer and polarized so as to prevent coupling of energy between the second receiving means and the second transmitting means.

3. Means for measuring the velocity between a pair of bodies comprising a first polarized radiating means mounted on the first body, a radio frequency oscillator supplying an input to the first transmitting means, a first receiving means mounted on the first body and polarized so as to prevent energy exchange between the first transmitting and receiving means, a balanced mixer receiving an input from the radio frequency oscillator and the first receiving means, a detector connected to the balanced mixer and producing an output which is four times the Doppler frequency shift between the pair of bodies, a second receiving means mounted on the second body and polarized so as to receive energy from the first transmitting means, a second balanced mixer receiving a signal from the second receiving means, an offset oscillator supplying an input to the second balanced mixer, and a second transmitting means receiving an input from the balanced mixer and polarized so as to prevent coupling of energy between the second transmitting and receiving means.

4. Means for measuring the velocity between a pair of bodies comprising a first polarized radiating means mounted on the first body, a radio frequency oscillator supplying an input to the first transmitting means, a first receiving means mounted on the first body and polarized so as to prevent energy exchange between the first transmitting and the first receiving means, a balanced mixer receiving an input from the radio frequency oscillator and the first receiving means, a filter receiving the output of the balanced mixer, a detector connected to the filter and producing an output which is four times the Doppler frequency shift between the pair of bodies, a second receiving means mounted on the second body and polarized so as to receive energy from the first transmitting means, a second balanced mixer receiving a signal from the second receiving means, an offset oscillator supplying an input to the second balanced mixer, and a second transmitting means receiving an input from the balanced mixer and polarized so as to prevent coupling of energy exchanges between the second transmitting and receiving means.

5. Means for measuring the velocity between a pair of bodies comprising a first polarized radiating means mounted on the first body, a radio frequency oscillator supplying input to the first transmitting means, a first receiving means mounted on the first body and polarized so as to prevent energy exchange between the first transmitting and the first receiving means, a balanced mixer receiving an input from the radio frequency oscillator and the first receiving means, a first filter receiving the output of the balanced mixer, a detector connected to the first filter and producing an output which is four times the Doppler frequency shift between the pair of bodies, a second receiving means mounted on the second body and polarized so as to receive energy from the first transmitting means, a second filter receiving a signal from the second receiving means, a second balanced mixer connected to the second filter, an offset oscillator supplying an input to the second balanced mixer, and a second transmitting means receiving an input from the balanced mixer and polarized so as to prevent coupling of energy exchanges between the second transmitting and receiving means.

References Cited in the file of this patent

UNITED STATES PATENTS

| | | |
|---|---|---|
| 2,134,716 | Gunn | Nov. 1, 1938 |
| 2,508,571 | Hudspeth | May 23, 1950 |